United States Patent
Cao et al.

(10) Patent No.: US 12,446,771 B2
(45) Date of Patent: Oct. 21, 2025

(54) 2D MULTI-LAYER THICKNESS MEASUREMENT

(71) Applicant: TOPCON CORPORATION, Tokyo (JP)

(72) Inventors: Bin Cao, Wayne, NJ (US); Zhenguo Wang, Ridgewood, NJ (US); Kinpui Chan, Ridgewood, NJ (US); Zaixing Mao, Tokyo (JP); Jongsik Kim, Fort Lee, NJ (US)

(73) Assignee: TOPCON CORPORATION, Tokyo (JP)

( * ) Notice: Subject to any disclaimer, the term of this patent is extended or adjusted under 35 U.S.C. 154(b) by 1132 days.

(21) Appl. No.: 16/911,094

(22) Filed: Jun. 24, 2020

(65) Prior Publication Data

US 2020/0405146 A1 Dec. 31, 2020

Related U.S. Application Data

(60) Provisional application No. 62/868,568, filed on Jun. 28, 2019.

(51) Int. Cl.
| | |
|---|---|
| *A61B 3/10* | (2006.01) |
| *A61B 3/00* | (2006.01) |
| *G06T 7/00* | (2017.01) |
| *G06T 7/62* | (2017.01) |

(52) U.S. Cl.
CPC ............ *A61B 3/101* (2013.01); *A61B 3/0025* (2013.01); *A61B 3/102* (2013.01); *G06T 7/0012* (2013.01); *G06T 7/62* (2017.01); *G06T 2207/20056* (2013.01); *G06T 2207/30041* (2013.01)

(58) Field of Classification Search
None
See application file for complete search history.

(56) References Cited

U.S. PATENT DOCUMENTS

| | | | |
|---|---|---|---|
| 4,645,349 A | 2/1987 | Tabata | |
| 5,486,701 A | 1/1996 | Norton et al. | |
| 6,236,459 B1 | 5/2001 | Negahdaripour et al. | |
| 7,281,801 B2 | 10/2007 | Wang | |
| 7,758,190 B2 | 7/2010 | Korb et al. | |
| 7,771,353 B2 | 8/2010 | Luce | |
| 7,963,655 B2 | 6/2011 | Huth et al. | |
| 8,602,557 B2 | 12/2013 | Huth et al. | |
| 9,173,558 B2 | 11/2015 | Huth et al. | |
| 9,615,735 B2 | 4/2017 | Huang et al. | |
| 9,757,027 B2 | 9/2017 | Arieli et al. | |
| 9,833,139 B1 | 12/2017 | Arieli et al. | |
| 2013/0141698 A1* | 6/2013 | Huth | A61B 3/103 351/246 |

(Continued)

OTHER PUBLICATIONS

Extended European Search Report for European Application No. 20182927.2 dated Dec. 9, 2020.

(Continued)

*Primary Examiner* — Samuel D Fereja
(74) *Attorney, Agent, or Firm* — McDonald Hopkins LLC

(57) ABSTRACT

A method for thickness measurement of a multi-layer object combines frequency analysis and a theoretical model. The frequency analysis is used to determine the thickness of a thicker layer of the object. The theoretical model is used to determine the thickness of the thinner layer of the object.

14 Claims, 10 Drawing Sheets

(56) References Cited

U.S. PATENT DOCUMENTS

| | | | | |
|---|---|---|---|---|
| 2013/0229624 A1* | 9/2013 | Korb | ........................ | A61B 3/14 |
| | | | | 351/246 |
| 2013/0265585 A1* | 10/2013 | Fang-Yen | .......... | G01B 9/02007 |
| | | | | 356/497 |
| 2014/0239181 A1* | 8/2014 | Hattori | ............... | G01B 9/02044 |
| | | | | 250/339.08 |
| 2018/0070813 A1* | 3/2018 | Arieli | ................. | G01B 9/02087 |
| 2021/0259540 A1* | 8/2021 | Ke | ........................ | A61B 3/101 |

OTHER PUBLICATIONS

King-Smith, et al. "Three interferometric methods for measuring the thickness of layers of the tear film." Optometry and Vision Science vol. 76, No. 1 (1999): 19-32.

Davidson, et al., "The tear film and ocular mucins", Veterinary Ophthalmology, vol. 7, No. 2, 2004, pp. 71-77.

Huang, et al., "In vivo thickness dynamics measurement of tear film lipid and aqueous layers with optical coherence tomography and maximum-likelihood estimation", Optics Letters, vol. 41, No. 9, May 1, 2016, pp. 1981-1984.

King-Smith, et al., "Can the mucus layer of the tear film be demonstrated by interferometry?", Investigative Ophthalmology & Visual Science, vol. 45, No. 13, May 2004, p. 3882, Abstract.

King-Smith, et al., "Tear Film Interferometry and Corneal Surface Roughness", IOVS, vol. 55, No. 4, Apr. 2014, pp. 2614-2618.

Cohen, et al., "Tear film imager for dynamic mapping of the human tear film", Applied Optics, vol. 58, No. 29, Oct. 10, 2019, pp. 7987-7995.

Prydal, "Changes in Roughness of the Ocular Surface with Blinking." Investigative Ophthalmology & Visual Science vol. 44, No. 13, May 2003, p. 2467, Abstract.

* cited by examiner

Mucus-Aqueous Index Map

Mucus-Aqueous Scattering Map

2D MULTI-LAYER THICKNESS MEASUREMENT

CROSS-REFERENCE TO RELATED APPLICATIONS

This application claims priority to U.S. Provisional Application Ser. No. 62/868,568, filed on Jun. 28, 2019, entitled "2D MULTI-LAYER THICKNESS MEASUREMENT", the entirety of which is incorporated herein by reference.

BACKGROUND

Dry eye has become one of the most common causes for ophthalmological doctor visits. Dry eye is a multifactorial disease of the ocular surface that is related to the tear film. As illustrated in FIG. 1, the tear film 100 comprises the outer layers of the eye including a lipid layer 102 that is about 0-200 nm thick, a muco-aqueous layer 104 (also referred to herein as the aqueous layer) that is about 2-10 µm thick, and the cornea 106, which is about 0.5 mm thick, follows the muco-aqueous layer. Although the mucus and aqueous layers are shown collectively in FIG. 1 as muco-aqueous layer 104, they may also be considered separate layers. Currently, few technologies exist for imaging and analyzing the layers of the tear film 100 (e.g., determining layer thickness) to objectively assist dry eye diagnosis.

Interferometric techniques are among the currently available non-invasive measurements. Of these, one approach relies on the correlation between an image color and the lipid layer thickness, either quantitatively or qualitatively. Theoretically, the analysis is performed based on two-dimensional (2D) images, and typically only the average thickness within a fairly large area is presented. However, this approach is usually limited for relative lipid layer thickness estimates and may be susceptible to phase ambiguity and uncertainty in absolute thickness measurement.

More rigorous numerical analysis of the reflection spectra can be performed based on physics models using Fourier transform/least square fitting techniques. However, this typically requires a spectrometer, which limits the measurement at a single spot and makes the system design complicated and more expensive.

Optical coherence tomography (OCT) has also been used for tear film thickness measurement by combining high-end ultrahigh resolution OCT and sophisticated statistical decision theory to determine thicknesses of various layers. Theoretically, 2D measurements can be achieved with a proper scanning mechanism, but practically ultrahigh resolution OCT systems are very expensive.

Lastly, fluctuation analysis by spatial image correlation has also been applied to quantify the thickness of the pre-corneal tear film. However, this technique has still yet to demonstrate the capability for lipid layer thickness measurement.

BRIEF SUMMARY

According to one example of the present disclosure a thickness measurement method comprises: obtaining a fringe image of a multilayer object, the multilayer object comprising a thick layer and a thin layer; transforming the fringe image into reflectance information; performing a frequency analysis of the reflectance information; determining a total thickness of the object based on the frequency analysis of the reflectance information; determining a thickness of the thick layer based on the determined total thickness; comparing the frequency analysis of the reflectance information to a frequency analysis of a theoretical model of the object; and determining a thickness of the thin layer based on the comparison, wherein the determined thicknesses are at the location of the object from which the fringe image was obtained.

In various embodiments of the above example, the method further comprises: obtaining a plurality of fringe images, each from a different location of the object; determining a blur score for each fringe image; and generating a measurement confidence indicator based on the determined blur scores; the method further comprises generating a thickness map of the object based on determined thicknesses from a plurality of locations of the object; the frequency analysis is a Fourier transform; the frequency analysis comprises harmonic frequency modulation; the object is a tear film, the thin layer is a lipid layer, and the thick layer is an aqueous layer; the method further comprises generating a mucus-aqueous index map and/or generating a mucus-aqueous scattering map; the index map is based on a ratio of amplitudes of corresponding peaks in the frequency analysis of the reflectance information and the frequency analysis of the theoretical model of the object; the index map is based on a difference of amplitudes of corresponding peaks in the frequency analysis of the reflectance information and the frequency analysis of the theoretical model of the object; the scattering map is based on a ratio of a full width at half maximum or a half width at half maximum of corresponding peaks in the frequency analysis of the reflectance information and the frequency analysis of the theoretical model of the object; the scattering map is based on a difference of a full width at half maximum or a half width at half maximum of corresponding peaks in the frequency analysis of the reflectance information and the frequency analysis of the theoretical model of the object; the method further comprises: determining a scaling factor based on the generated mucus-aqueous index map and/or the mucus-aqueous scattering map; and adjusting the obtained fringe image based on the scaling factor; the method is performed in real-time with imaging of the object; and/or the fringe images are obtained by imaging the object with an interferometric imaging system utilizing discrete narrow spectral bands.

DETAILED DESCRIPTION OF THE DRAWING

Figure 1:
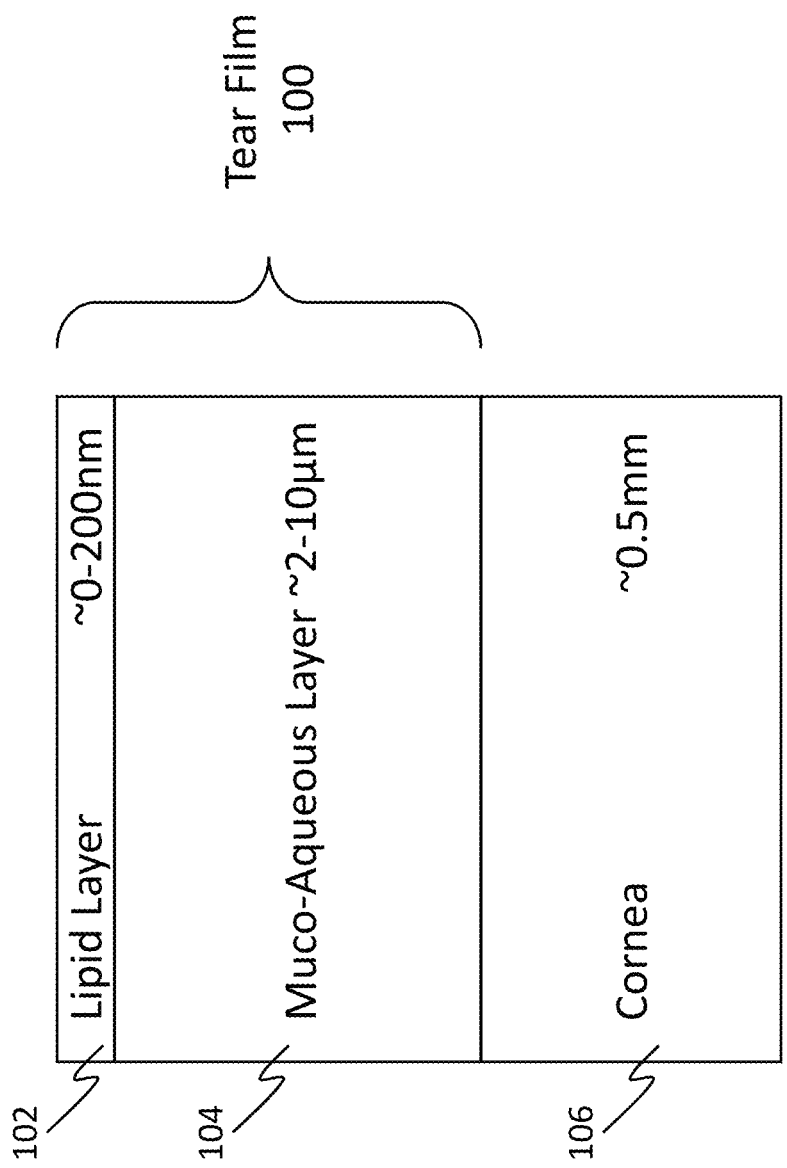
FIG. 1 is a schematic representation of the layers of the eye and the tear film.

Based on the foregoing deficiencies, the present disclosure relates to an improved thickness measurement technique, which is based in part on the recognition that 'fringe' images carry thickness information for both the lipid and muco-aqueous layers of the tear film. In contrast, it has been traditionally understood that color fringes are only affected by the lipid layer, and therefore the muco-aqueous layer has been ignored when interpreting the color fringes. In view of this recognition, the present disclosure describes a method for determining thickness for both lipid and muco-aqueous layers from 2D color/multi-spectral fringe images.

Initially, it is noted that 'fringe' images are those resulting from interference among reflected light rays from an incident light beam on an imaged object. Notably, when an incident light beam (having a wavelength k) traveling through a medium comes into contact with a boundary to another layer, a portion of that light beam is reflected while another portion is transmitted through the barrier, and refracted. If the transmitted portion comes into contact with another medium barrier, it too is partially transmitted/refracted and partially reflected. As a result, multiple light rays having traveled different path lengths, are transmitted back through the original medium away from barriers. When the path length differences between the reflected rays is an odd multiple of $\lambda/2$, the beams are out of phase with each other and produce destructive interference; and when the path length differences are an even multiple of $\lambda/2$, the beams are in phase with each other and produce constructive interference. This interference can form a 'fringe' image, whereby regions of destructive interference produce a dark fringe and regions of constructive interference produce a bright fringe.

Based on these principles, a theoretical mathematical model can be developed for determining the path lengths of the rays reflected by respective medium barriers based on a measured intensity of reflected light and given a known wavelength of incident light and indices of refraction. With multiples measurements, multiple path lengths can be solved for where the path lengths (and their relative differences) are related to the thicknesses of each layer of a structure (e.g., the tear film). In some embodiments, the measurements may be derived from incident light from multiple narrow spectral bands. Such a technique is described in U.S. patent application Ser. No. 16/252,818 titled "2D MULTI-LAYER THICKNESS MEASUREMENT" and filed on Jan. 21, 2019, which is herein incorporated by reference.

Herein, the above-described theoretical model may be modified to take into account the fact that the aqueous-mucus boundary is not optically well-defined by introducing a scaling factor, and that light is scattered in addition to being reflected at the aqueous-mucus boundary such that the scattering effect can be quantified. Further, experiments for measuring tear film thicknesses have further indicated that the actual strength of measured signals for in vivo tear film layer thickness measurements appears to be weaker than that predicted by theoretical models. Additionally, the measurement results can be very sensitive to optical alignment, for example, defocus and transversal alignment. Accordingly, additional analysis techniques are also described herein.

Figure 2:
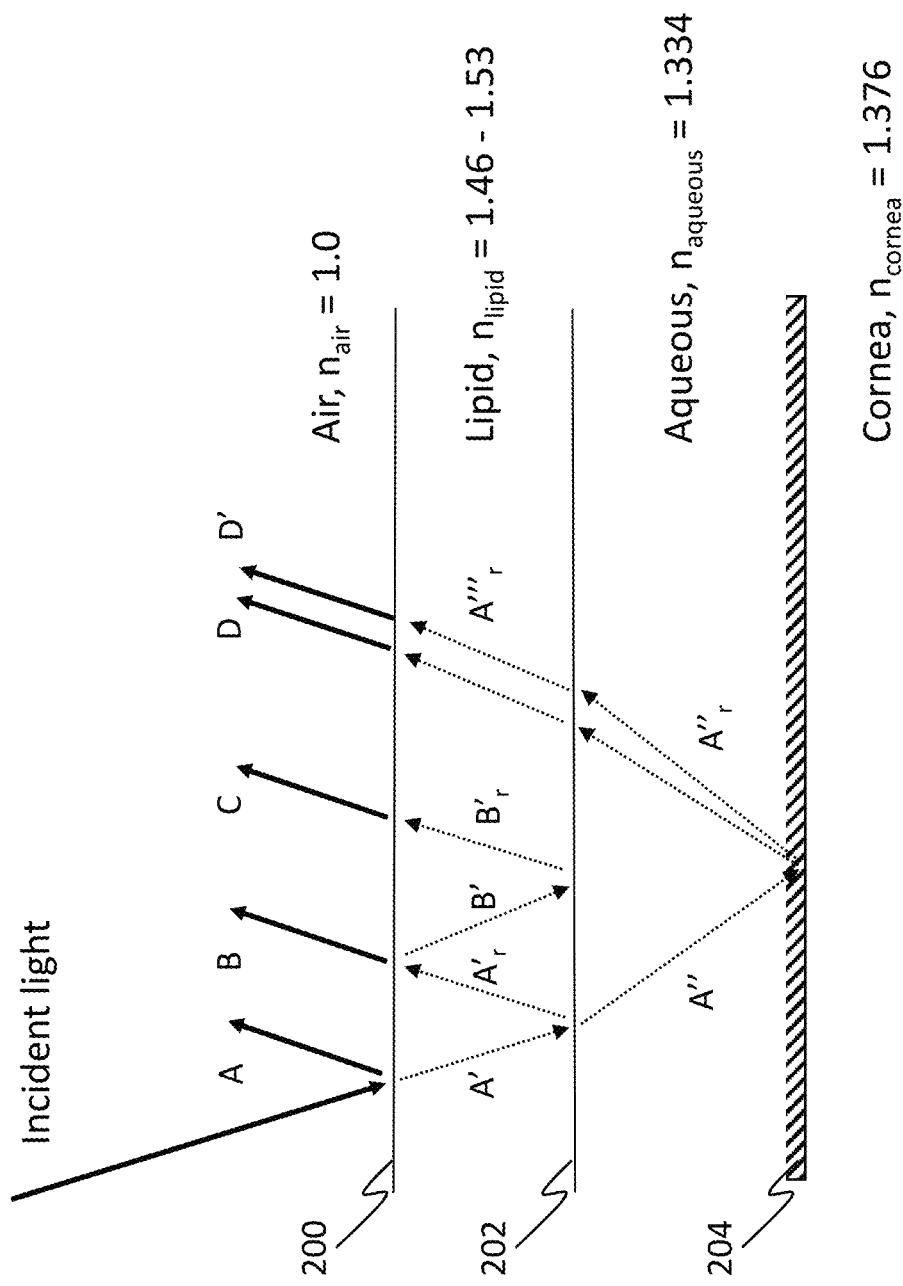
FIG. 2 illustrates transmission, refraction, and reflection of an incident light beam through the tear film.

More particularly, an example of the revised model is of transmission, reflection, and refraction for a light beam incident to the tear film is illustrated in with reference to FIG. 2. The resulting reflected rays of light from the incident beam are identified as rays A-D, and D'. D is the reflection from the well-defined aqueous-mucus layer, while D' is the reflection from the not well-defined aqueous-mucus layer 204. Similar to the description in the '818 application, the intensity for each pixel of a fringe image of the tear film is related to the thickness of each layer as follows:

$$I(\lambda) = \alpha(\lambda) - \beta(\lambda)\cos\left(\frac{4\pi n_{lipid} d_{lipid}}{\lambda}\right) + \quad \text{(Equation 1)}$$
$$SF(\lambda) * \gamma(\lambda)\cos\left(\frac{4\pi(n_{lipid} d_{lipid} + n_{aqueous} d_{aqueous})}{\lambda}\right)$$

where $\alpha(\lambda) \sim 10^{-2}$ and $\beta(\lambda)$, $\gamma(\lambda) \sim 10^{-3}$, $SF(\lambda)$ is the scaling factor that takes into account the not well-defined aqueous-mucus layer, n is the refractive index of the respective layers, and d is the thickness of the respective layers. Equation 1 is based on Maxwell's equations; however, the particular model may be derived differently, such that a different equation representing intensity is solved for the layer thicknesses.

Regardless of the equation used to represent intensity, the actual measured intensity may be a summation of intensities for each incident wavelength in a given band of light from a light source (e.g., a discrete narrow band). In the example where the measurement is performed for a band having wavelengths between $\lambda_1$ and $\lambda_2$, the measured intensity can be summarized as:

$$I_{measured}(\lambda_1, \lambda_2) = \int_{\lambda_1}^{\lambda_2} I(\lambda) E_{optics}(\lambda) E_{sensor}(\lambda) \quad \text{(Equation 2)}$$

where $I(\lambda)$ is an equation representing a measured intensity at a particular wavelength $\lambda$, $E_{optics}(\lambda)$ is the spectral response of the optical system used to pass the incident and reflected lights, and $E_{sensor}(\lambda)$ is the spectral response of a light sensor that detects the reflected light—in other words, the imaging sensor and system characteristics. In other embodiments, summation over wavelengths within each band can be used to determine an intensity for each band (that may be used to solve for layer thicknesses), without necessarily accounting for the spectral responses of the optical system and/or the sensor.

As noted above, the distances $d_{lipid}$ and $d_{aqueous}$ of the lipid and aqueous layers, respectively, can be determined for a detected intensity of reflected light, given a known wavelength of incident light and index of refraction. In this example with only two unknown variables, $d_{lipid}$ and $d_{aqueous}$, theoretically only two independent intensity measurements are required to solve for those variables. Of course, in practice, more measurements can be performed. Additionally, more layers can be solved for by producing equations of a similar form to Equations 1 and 2. And as indicated above, measurements of intensity $I(\lambda)$ of Equation 1 and/or $I_{measured}(\lambda_1, \lambda_2)$ of Equation 2 for wavelengths of incident light may be in discrete narrow spectral bands (between $\lambda_1$ and $\lambda_2$). The models of Equations 1 and 2 can be used to derive theoretical fringe image intensities and reflection information for tear films having different layer thicknesses, which can be compared with experimentally measured fringe images and reflection information as described below.

Figure 3:
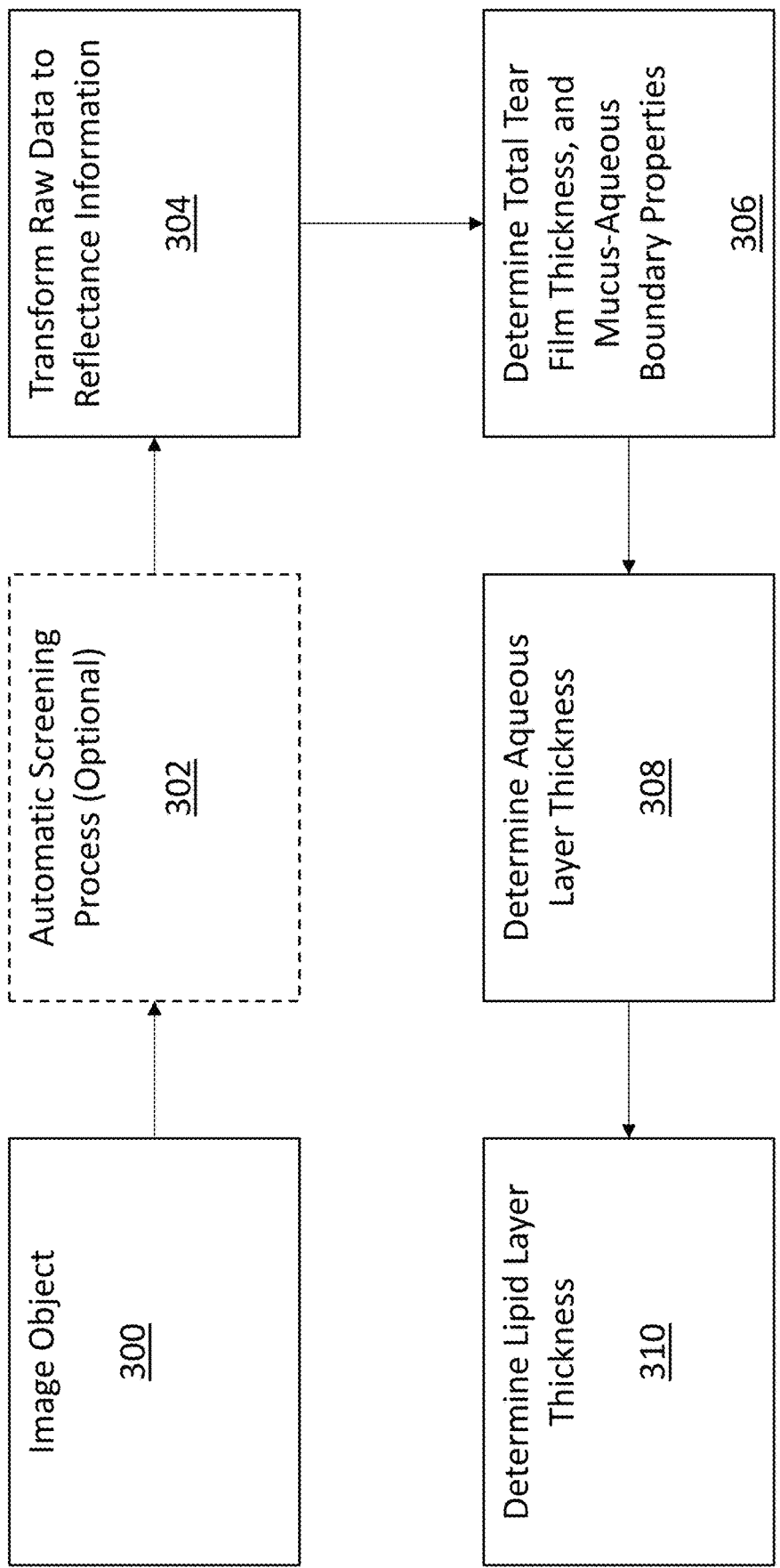
FIG. 3 illustrates a flow chart of an example method for determining tear film layer thicknesses according to the present disclosure.
Figure 4:
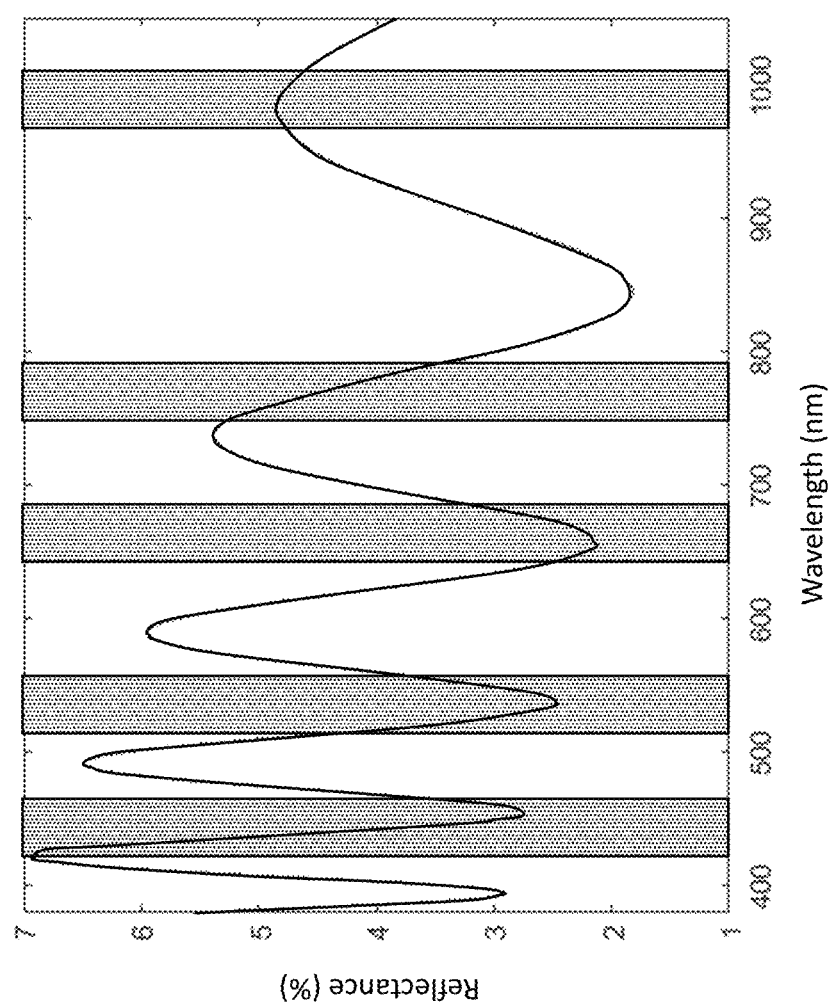
FIG. 4 illustrates example discrete narrow spectral bands for imaging an object.
Figure 5:
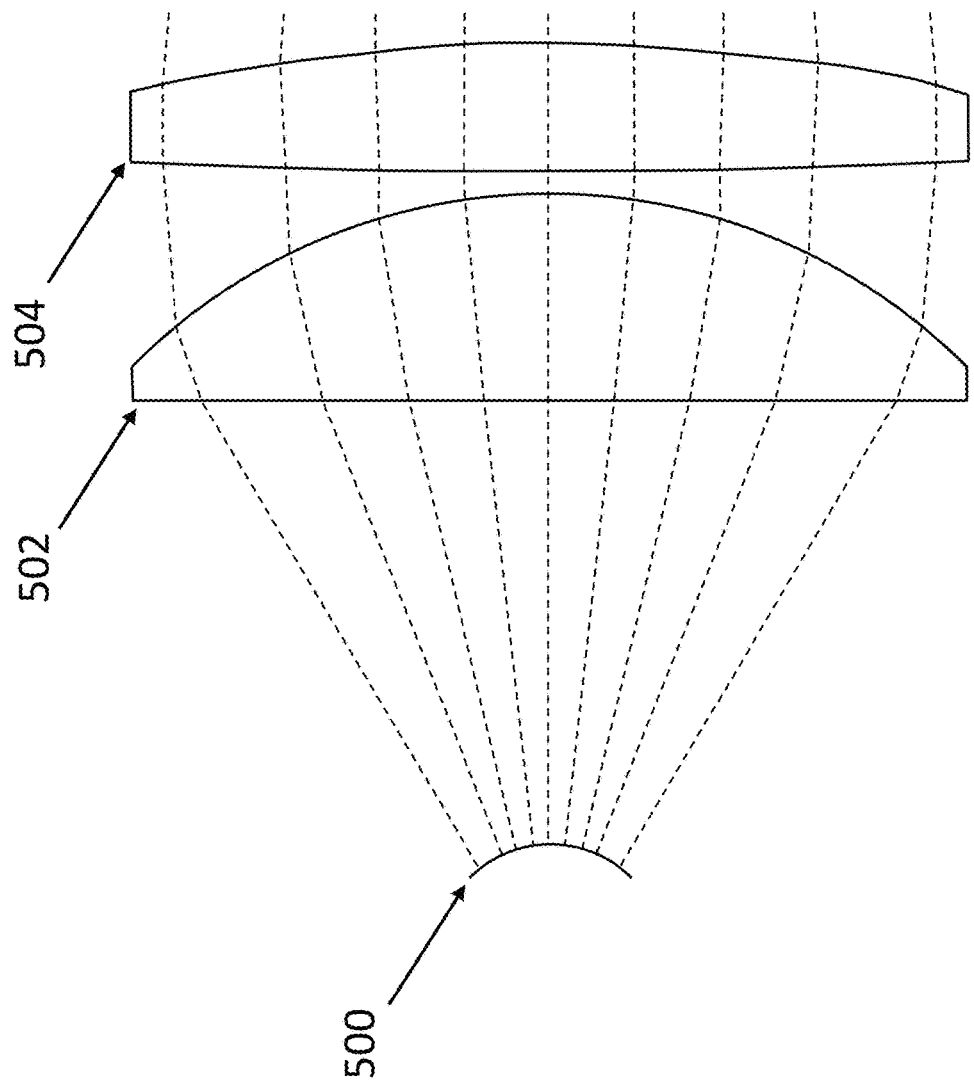
FIG. 5 illustrates example optics used in imaging an object.

The general process then for determining the thicknesses of the aqueous and lipid layers is shown in FIG. 3. First, the tear film is imaged 300, for example with discrete narrow spectral bands as described in the '818 application, to produce fringe images (and the underlying data). An example of such illumination is shown in FIGS. 4 and 5. Particularly, FIG. 4 illustrates example discrete narrow spectral bands that may be used for imaging, and the corresponding reflectance. This example includes five bands between about: 1) 425-475 nm, 2) 500-550 nm, 3) 650-700 nm, 4) 750-800 nm, and 5) 950-1000 nm. According to another example, each band may be centered at 400 nm, 500 nm, 600 nm, 700 nm, and 800 nm. According to another non-limiting example, the discrete narrow spectral bands may be between 5 nm and 100 nm wide, for example, about 40 nm. Of course, more or less than five bands may be used, and the bands may be of different wavelengths and widths.

FIG. 5 illustrates optics used in imaging an object. As shown therein, incident light is focused on the tear film 500 by different glasses 502, 504 so as to be perpendicular at its incident point, taking into account the curvature of the eye.

Following imaging, an automatic screening process (an automatic data selection process) 302 may optionally be performed on the imaging data. Such a process is intended to keep data determined to be 'good' for further processing. This is because, for example, when imaging the tear film, the quality of some images may be too poor to be used for reconstructing/determining the layer thickness. This may occur if the image is, for example, out of focus image or otherwise blurred. The automatic screening process identifies these images/data, and selects those meeting a particular quality threshold. In one example, the process may produce a blur score for each image, which may then further be used to construct an indicator for measurement confidence. For example, if the majority of images in relevant measuring regions have a low blur score (or are otherwise identified as higher quality), the thickness measurements resulting from those images may be given a high measurement confidence indicator.

Following screening, the raw fringe image intensity data may then be transformed 304 into reflectance information based on a calibration of the spectral response of the imaging system. The calibration makes the spectral response of the measurement system equal for every detected wavelength. In other words, the calibration equalizes $E_{optics}(\lambda)E_{sensor}(\lambda)$ (from Equation 2) for all imaging wavelengths $\lambda$. In this way, the influence of the spectral response on the measured intensity can be accounted for, and separated from, the measured intensity $I_{measured}$ leaving the actual reflectance information. This calibration may be accomplished, for example, based on a measured intensity from a calibration target (e.g., a Bk7 glass, having the same curvature of the tear film) with the system. The measured intensity from the calibration can then be used to normalize the measured intensity from the eye, as follows:

$$R_{eye}(\lambda) = \frac{I_{eye}(\lambda)}{I_{Bk7}(\lambda)} \times R_{Bk7}(\lambda)$$

where $R_{eye}(\lambda)$ is the reflectance from the eye at a wavelength $\lambda$, $R_{Bk7}(\lambda)$ is the theoretical reflectance from Bk7 glass (or other calibration target), $I_{eye}(\lambda)$ is the measured intensity from the eye by the sensor, and $I_{Bk7}(\lambda)$ is the measured intensity from the Bk7 glass (or other calibration target) by the sensor.

In one example, the transformation 304 first includes a reflectance calculation by calibrating and normalizing intensity as discussed above, followed by subtraction of a DC component from the reflectance calculation by fitting of the reflectance calculation to a third order polynomial, so that the oscillation information of the reflectance signal from the tear film across a wide spectrum (beyond just the narrow bands used for imaging) can be extracted.

The total thickness of the tear film is then determined 306 from a frequency analysis (e.g., Fourier transform and/or harmonic frequency modulation) of the transformed data. Mucus-aqueous boundary properties can also be determined 306 with the frequency analysis. The frequency analysis can include application of a Hann window followed by a Fourier transform. The thickness can be determined based on the frequency at a peak in the transform signal. For example, the relationship of the transformed signal and the thickness can be express as:

$$\frac{4\pi(n_{lipid}d_{lipid} + n_{aqueous}d_{aqueous})}{\lambda} = 4\pi^2 f_{peak}/\lambda \quad \text{(Equation 3)}$$

where $f_{peak}$ is the peak frequency of the Fourier transform of the signal from the domain. It then follows from Equation 3 that $n_{lipid}d_{lipid}+n_{aqueous}d_{aqueous}=\pi f_{peak}$, so the total optical thickness of the tear film $n_{lipid}d_{lipid}+n_{aqueous}d_{aqueous}$ can be calculated from the peak frequency of the Fourier transform.

In other embodiments, a harmonic frequency modulation technique may be applied to the transformed data. An example harmonic frequency modulation technique is provided in U.S. patent application Ser. No. 16/829,673 titled "METHOD AND APPARATUS FOR MEASURING TEAR FILM THICKNESS USING OPTICAL INTERFERENCE," filed on Mar. 25, 2020, which is herein incorporated by reference. In one example, the total thickness is based on an amplitude of a second peak of the frequency spectrum of the reflectance information.

Finally, the aqueous layer thickness can be determined 308 from the total thickness of the tear film, and the lipid layer thickness can be determined 310 by matching/comparing the reflectance information to a theoretical model of the reflectance profile based on modeled/known tear film thickness profile. Since the lipid layer is relatively thin compared to the aqueous layer, it can be assumed that the aqueous layer thickness is equal to the total thickness of the tear film. For example, with reference to Equation 3, since the lipid thickness $d_{lipid}$ is very small compared with the aqueous thickness $d_{aqueous}$, the total optical thickness of the tear film can be considered as the optical thickness of the aqueous layer thickness:

$$n_{aqueous}d_{aqueous} = \pi f_{peak}$$

such that $$d_{aqueous} = \frac{\pi f_{peak}}{n_{aqueous}}$$

Figure 9:
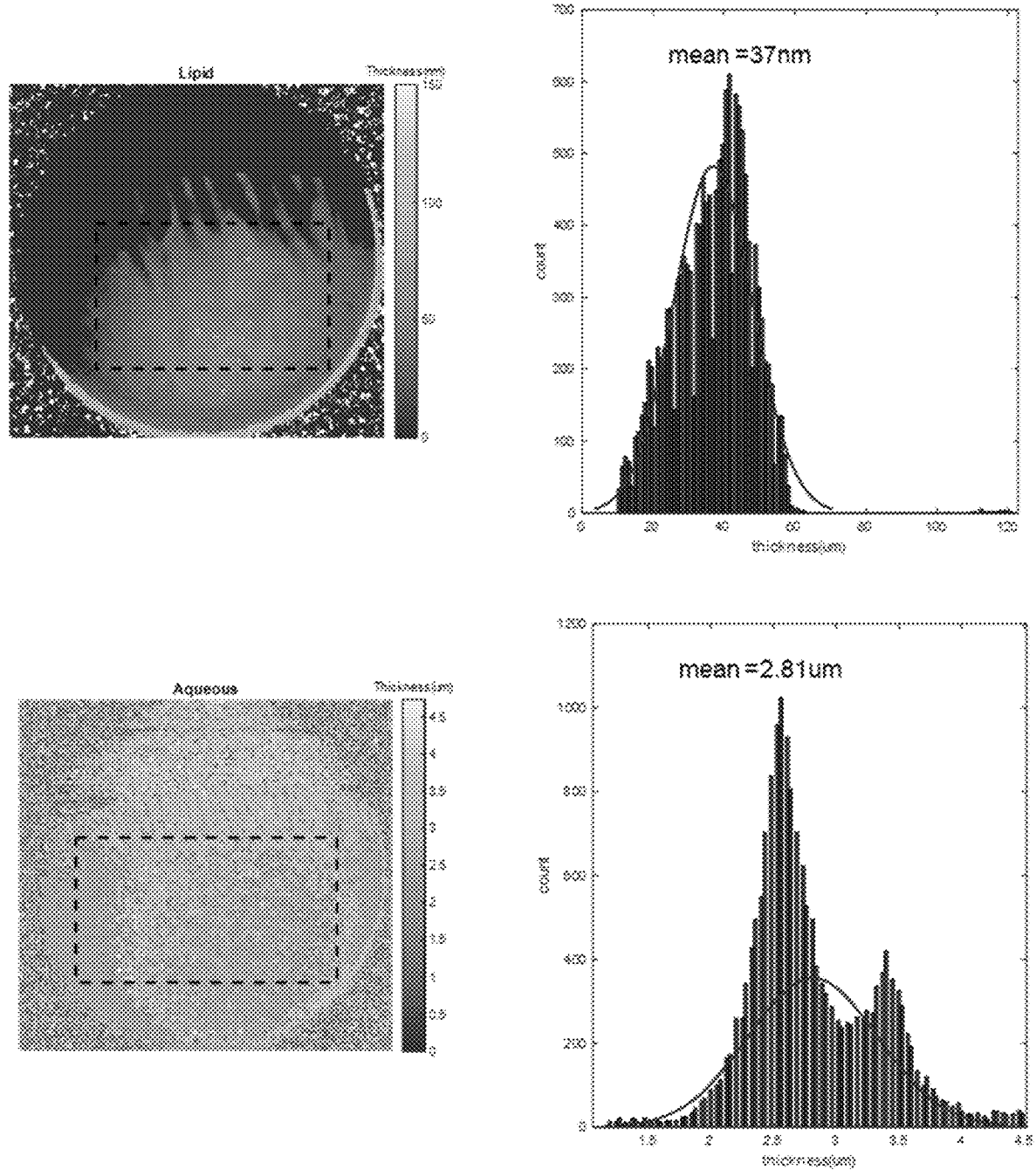
FIG. 9 illustrates example 2D thickness maps of the lipid and aqueous layers, and the thickness histograms, distributions and mean values for a region of interest in the map.

Based on the aqueous layer thickness, a look up table or curve fitting technique may then be applied to determine the corresponding lipid layer thickness 310 for an experimentally obtained reflectance profile. With determined thicknesses at locations in a two-dimensional region, a thickness map of each layer (and/or the tear film in total) can be generated for that region. Example thickness maps for the lipid and aqueous layers are illustrated in FIG. 9.

In performing the above method, it is noted that a maximum thickness measurement is limited by the number of spectral bands of the detected reflected light, and the wavelength range of the incident/reflected light, based on the Nyquist theorem:

$$d_{max} = \frac{\text{Number of spectral bands}}{4n\left(\frac{1}{\lambda_1} - \frac{1}{\lambda_2}\right)}$$

where $\lambda_1$ and $\lambda_2$ are the starting and ending wavelengths of the spectral band, and $d_{max}$ is the maximum thickness of the thin film. Similarly, the minimum thickness measurement is potentially limited by the total spectral bandwidth:

$$d_{min} = \frac{C \cdot \lambda_0^2}{\Delta\lambda}$$

where C is a constant related to the spectral shape, $\lambda_0$ is the central wavelength of the spectrum, and $\Delta\lambda$ is the total spectral bandwidth. However, it is possible to further reduce $d_{min}$ by using a harmonic frequency modulation technique, such as that described in the '673 application.

For the particular application of the method described herein for tear film layer thickness measurements (where the lipid layer is 0-200 nm, and the aqueous layer is 0-10 µm, the total spectral bandwidth and sampling resolution is thus preferably limited by:

$$\frac{\text{Num of sampling points}}{4\left(\frac{1}{\lambda_1} - \frac{1}{\lambda_2}\right)} \geq n_1 d_1 + n_2 d_2$$

where $n_1$ and $n_2$ are the refractive indices of the lipid and aqueous layers, respectively, $d_1$ and $d_2$ are the thicknesses of the lipid and aqueous layers, respectively. Further, the sampling points are preferably located on the peaks and valleys of the interference signal.

By way of example, assume the lipid layer thickness $d_1$=200 nm, the aqueous layer thickness $d_2$=5 µm, the refractive index of the lipid, aqueous, and mucin layers are $n_1$=1.5, $n_2$=1.334, and $n_3$=1.376, respectively, and the wavelength of the broadband light source is 460 nm to 640 nm. To reconstruct the total thicknesses of the lipid and aqueous layers, the number of spectral bands is preferably at least 16 and those 16 spectral bands are preferably substantially evenly distributed within the total spectral range of 460-640 nm. A minimum thickness able to be detected would then be ~1 µm with straightforward analysis based on a Fourier transform.

In addition to the above, the mucus-aqueous boundary may be quantified to account for scattering and to apply a scaling factor for the poorly defined optical boundary. This quantification can be made by using a mucus-aqueous index and scattering map, where the mucus-aqueous index map is based on the ratio and/or difference between the amplitude of the Fourier transform of the theoretical and the experimental reflectances, and the mucus-aqueous scattering map is based on the ratio and/or difference between the Full Width at Half Maximum (FWHM) or Half Width at Half Maximum (HWHM) of the Fourier transform of the theoretical and experimental reflectances. The resulting mucus-aqueous indices can be, or be used to generate, the above-mentioned scaling factor.

Figure 6:
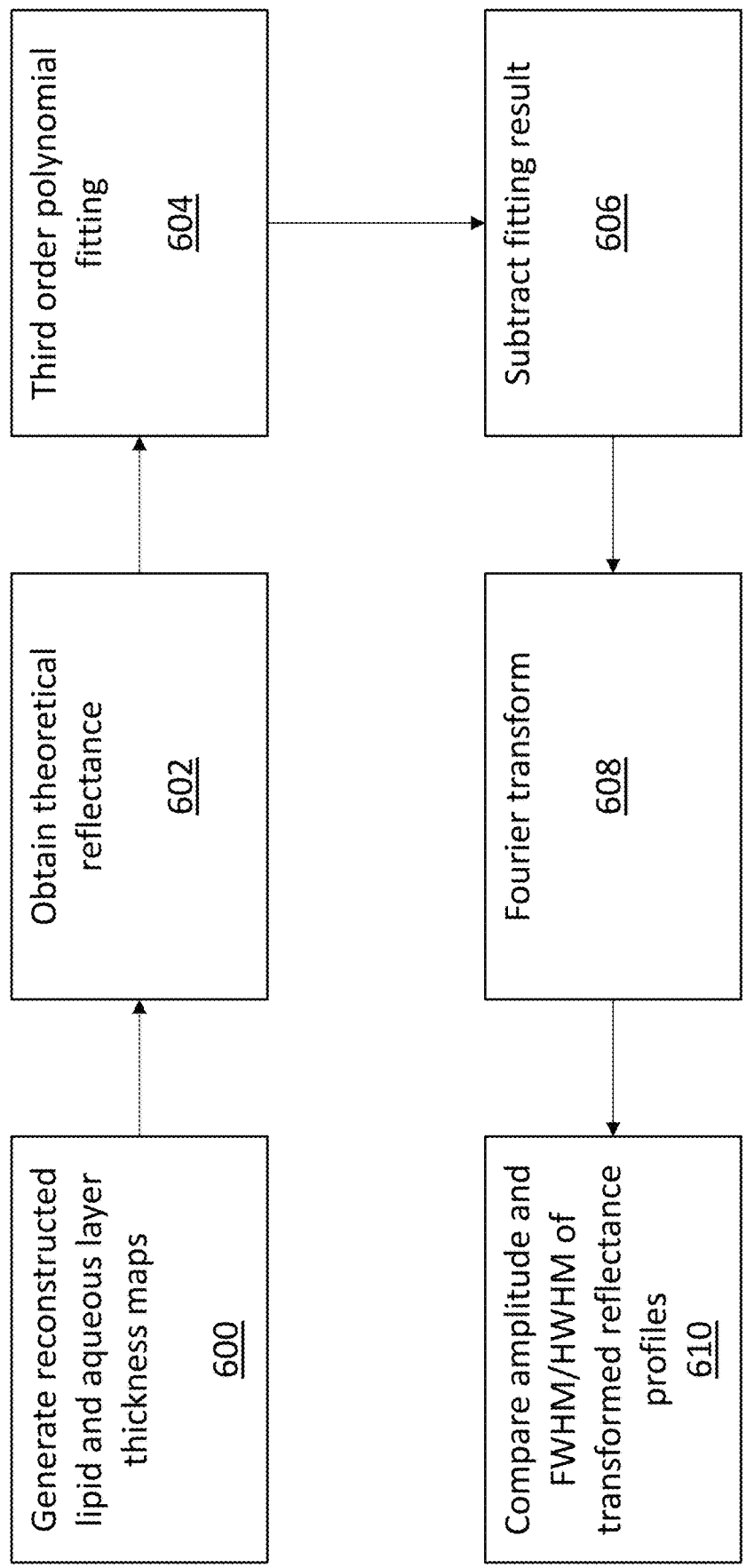
FIG. 6 illustrates an example method for generating a mucus-aqueous index and scattering map.

An example method for obtaining these maps is shown in FIG. 6. According to the method therein, after lipid and aqueous layer thickness maps are generated 600, the theoretical reflectance profile is obtained 602 and the then fitted to a third order polynomial 604 to obtain its DC component. The DC component is then subtracted from the reflectance profile 606, and a Fourier transform performed on the result 608. Finally, the amplitude and FWHM and/or HWHM values of the theoretical and experimentally determined reflectance profiles are compared 610. The aqueous layer index and scattering map can be generated from the comparison results.

Figure 7:
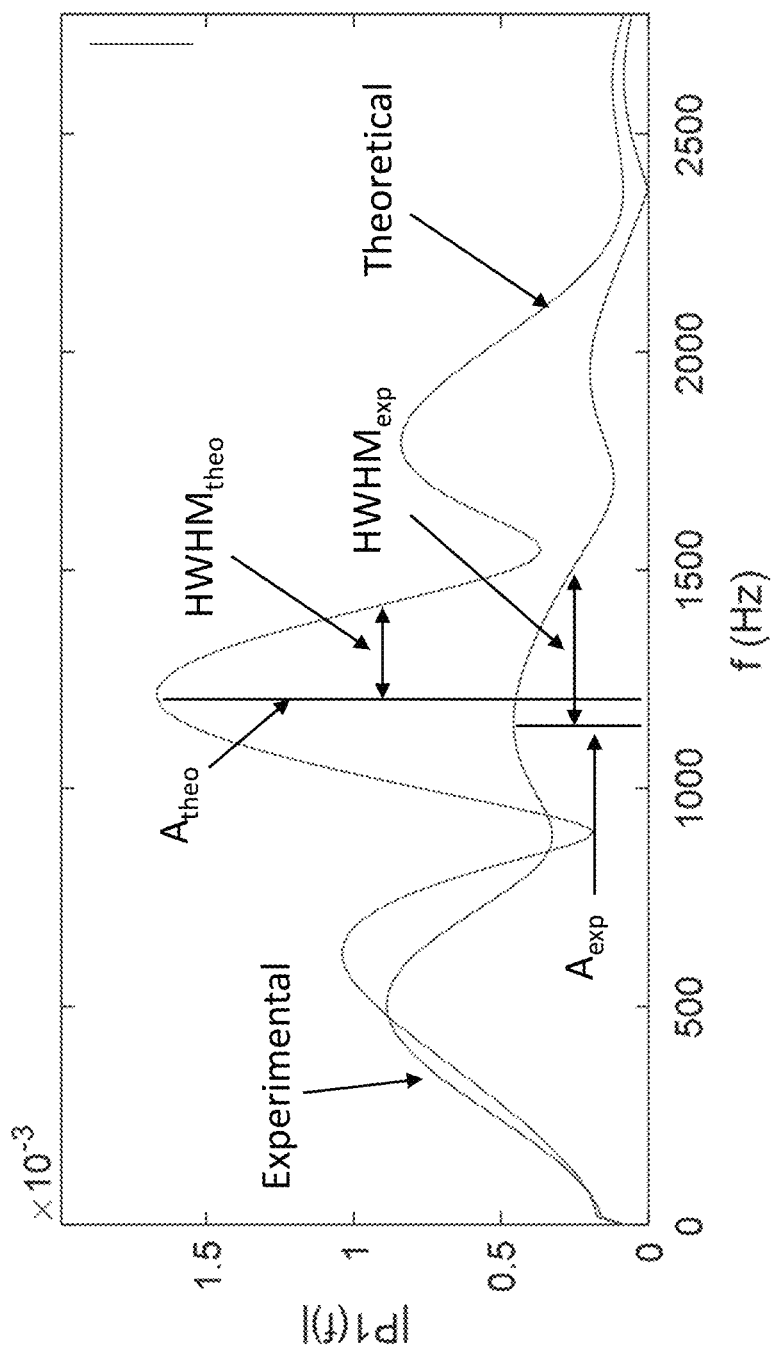
FIG. 7 illustrates an example comparison of transformed reflectance profiles for generating a mucus-aqueous index and scattering map.
Figure 8A:
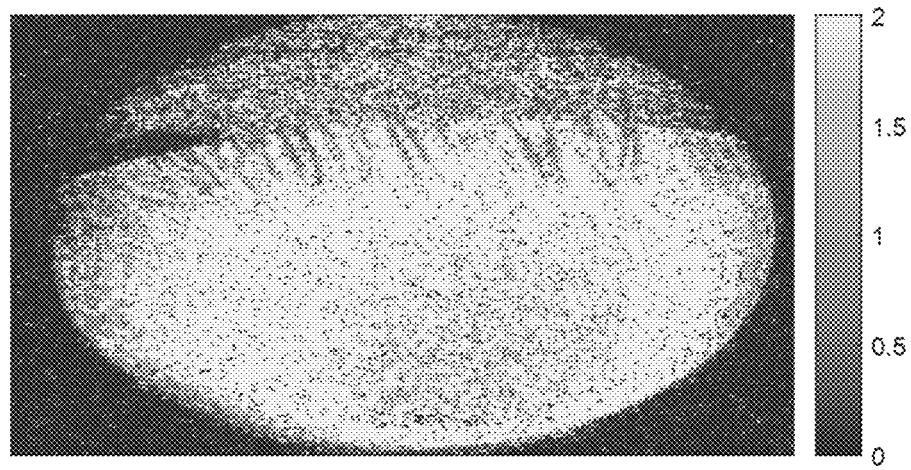
FIGS. 8A and 8B illustrate mucus-aqueous index and scattering maps, respectively.
Figure 8B:
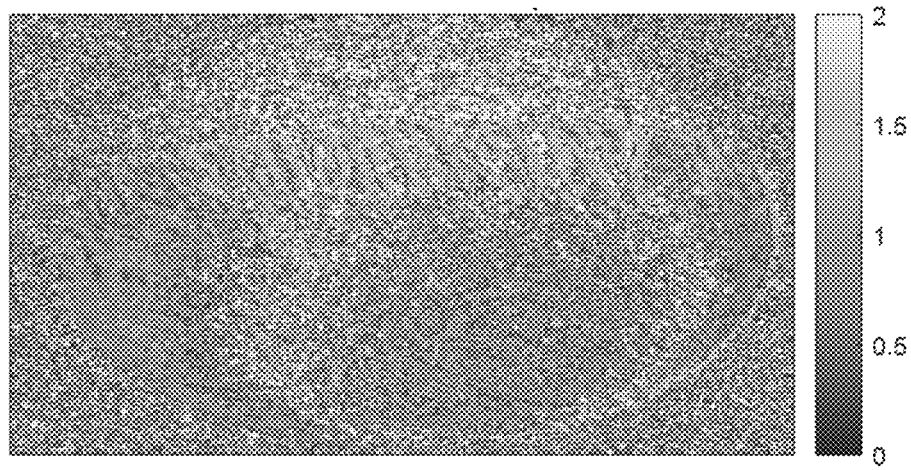

This concept is further illustrated in FIG. 7. Therein, the location (frequency) of the second peak of the theoretical (a Fourier transform of the theoretical reflectance signal) and the experimental (a Fourier transform of the experimentally obtained reflectance signal) curves contain the total thickness information. The mucus-aqueous index map is generated based the ratio and/or difference between the corresponding amplitudes $A_{theo}$ and $A_{exp}$ at this peak, and the mucus-aqueous scattering map is generated based the ratio and/or difference between the half width at half maximum $HWHM_{theo}$ and $HWHM_{exp}$ (or FWHM). Example maps, based on ratios between the theoretical and experimental reflectances, are shown in FIGS. 8A and 8B. These maps in FIGS. 8A and 8B are shown in 2D to collectively illustrate the values obtained for each location of the tear film in a region of interest; the spectrums shown in FIG. 7 being representative of an individual location. The maps of FIGS. 8A and 8B may also be provided in color.

These mucus-aqueous index and scattering maps can be used to modify the theoretical lookup table used to relate layer thicknesses to a detected reflectance. This modified lookup table can improve the thickness reconstruction accuracy. This process can be iteratively performed until a desired result accuracy is achieved.

Further, the mucus-aqueous indices and the mucus-aqueous scattering map indicate a roughness of the mucus layer, which can be utilized by a clinician to evaluate a health of the tear film. The scattering map may also indicate the structure of microvilli on the surface of the corneal epithelium, and may be indicative of dry eye syndrome or other ocular inflammation.

Dynamic measurements (e.g., real-time measurements) may also be made within the scope of the present disclosure. Therein, the layer thicknesses and mucus-aqueous boundary properties may be determined in real-time. Further, quantities of these properties may be determined and analyzed (e.g., rate of change in determined thickness) dynamically (in real-time). As used herein, 'real-time' is understood to mean that the measurements are made during imaging of the object, and preferably with only limited or no intentional delay, recognizing that performing the above-described method practically has some processing time.

Figure 10:
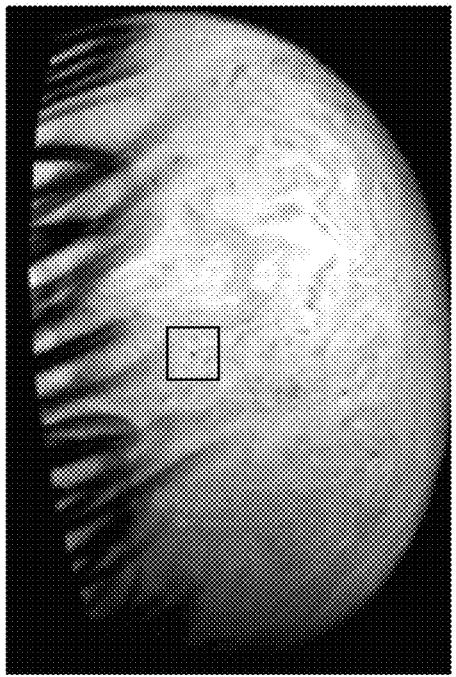
FIG. 10 illustrates example results from a dynamic thickness measurement.
Figure 10:
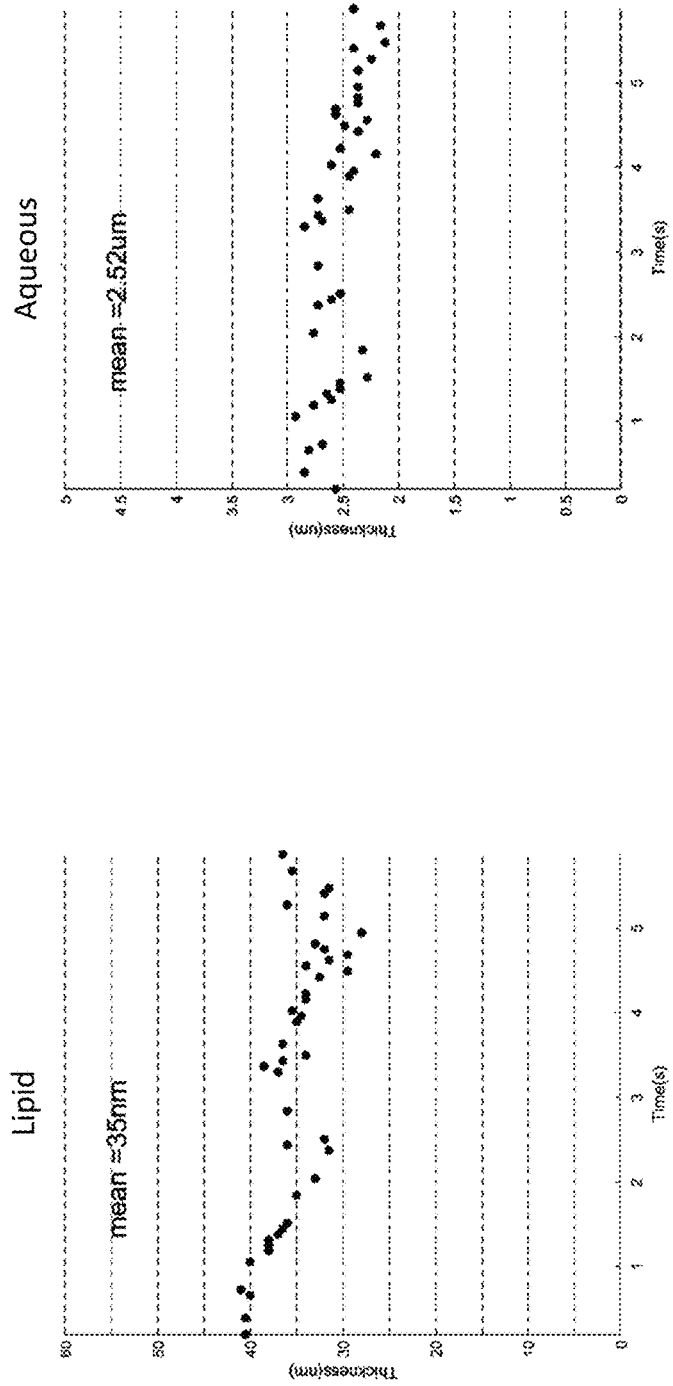

FIGS. 9 and 10 illustrate example thickness measurement results for tear films according to the description herein. In particular, FIG. 9 illustrates 2D thickness maps of the lipid and aqueous layers, and the thickness histograms, distributions and mean values for the area identified by the boxes on the 2D maps for each layer. These results are from a human subject tear film imaged in vivo. As seen therein, the mean thickness of the lipid layer for the region of interest within the thickness map is 37 nm, and the mean thickness of the aqueous layer for the same region of interest is 2.81 µm. Although shown in black and white, these maps may also be generated in color.

FIG. 10 illustrates results during a dynamic thickness measurement. That is, a real-time thickness measurement for a particular location of the tear film. The image of FIG. 10 represents an intensity image of the tear film obtained at one point in time during the measurement, with the measurement location indicated by the boxed region of the image. The measured lipid and aqueous layer thicknesses at that location are charted with respect to time, and show an average thickness measurement of 35 nm for the lipid layer and 2.52 µm for the aqueous layer.

A system for executing the above-described techniques is also contemplated within the scope of the present disclosure. Such a system may include a computer having one or more processors (e.g., in the form of an integrated circuit(s), discrete circuitry, or the like) for executing the technique, storage (such as a hard disk, memory, RAM, or the like) and an input/output interface (e.g., display, keyboard, mouse, and the like). The execution can be realized by arrangement of discrete components capable of performing the described functionalities (e.g., filtering) and/or by software embodied as instructions stored on a non-transitory computer-readable medium. The storage may be located locally with the computer and/or remotely, for example at a centralized database; and can be used to store images and volume datasets, analysis results, the software for executing the shadow reduction technique, and the like. The system may also be integrated or separate from a system used to capture the images. For example, the computer may be the same as that used to control an OCT system. Still further, the fringe images of the method herein may be obtained with such an OCT (or like interferometric) imaging system.

Considering the above, alone or in combination with any of the above aspects, thin film layer thickness measurements can be based on a combination of frequency analysis and theoretical model techniques; where the frequency analysis can be used to determine the thickness of a thicker layer of the thin film structure, and the theoretical model analysis can be used to determine the thickness of a thinner layer of the structure. Alone or in any combination with any of the above aspects, these layers may correspond to the aqueous layer and lipid layer of where the structure is a tear film. Alone or in any combination with any of the above aspects, the frequency analysis may include Fourier transforms and harmonic frequency modulations, where the harmonic frequency modulation can further reduce the minimum measurable thickness for the thicker layer. Alone or in any combination with any of the above aspects, blur detection can be used for data screening and serve as a potential indicator for measurement confidence.

Further alone or in any combination with any of the above aspects, for tear film measurements, the mucus-aqueous properties in can be characterized in 2D mucus-aqueous index maps and mucus-aqueous scattering maps. Alone or in any combination with any of the above aspects, histograms can be used to represent thickness measurements, for example, so that Gaussian fitting or double Gaussian fitting based on the histogram can quantify tear film thicknesses. Alone or in any combination with any of the above aspects, in generating the index and scattering maps, ratios, differences (subtraction), and other mathematical relationships may be used to relate the theoretical and experimental reflectances.

Still further alone or in any combination with any of the above aspects, dynamic measurements (e.g., real-time) of tear film layer thickness (e.g., the lipid layer, aqueous layer, and mucus-aqueous boundary properties) may be made in either one dimension or two dimensions. Alone or in any combination with any of the above aspects, the dynamic changes in the properties may be quantified, for example, the change rate for lipid layer, aqueous layer, and mucus aqueous boundary properties. Alone or in any combination with any of the above aspects, additionally, comparison of measurements may be made over a period of time, for example, via follow-up measurements and monitoring of treatments (e.g., eye drops) to determine effects and changes before and after the treatment, and at different time points during the treatment.

While various features are presented above, it should be understood that the features may be used singly or in any combination thereof. Further, it should be understood that variations and modifications may occur to those skilled in the art to which the claimed examples pertain. Similarly, while the above disclosure primarily relates to imaging of the tear film of an eye, the disclosure may also be applied to imaging and determining layer thicknesses for any other multilayer structure.

What is claimed is:

1. A thickness measurement method, comprising:
   obtaining a fringe image of a multilayer object, the multilayer object comprising a thick layer and a thin layer;
   transforming the fringe image into reflectance information;
   performing a frequency analysis of the reflectance information;
   determining a total thickness of the object based on the frequency analysis of the reflectance information;
   determining a thickness of the thick layer based on the determined total thickness;
   comparing the frequency analysis of the reflectance information to a frequency analysis of a theoretical model of the object; and
   determining a thickness of the thin layer based on the comparison,
   wherein the determined thicknesses are at the location of the object from which the fringe image was obtained.

2. The method of claim 1, further comprising:
   obtaining a plurality of fringe images, each from a different location of the object;
   determining a blur score for each fringe image; and
   generating a measurement confidence indicator based on the determined blur scores.

3. The method of claim 1, further comprising:
   generating a thickness map of the object based on determined thicknesses from a plurality of locations of the object.

4. The method of claim 1, wherein the frequency analysis is a Fourier transform.

5. The method of claim 1, wherein the frequency analysis comprises harmonic frequency modulation.

6. The method of claim 1, wherein the object is a tear film, the thin layer is a lipid layer, and the thick layer is an aqueous layer.

7. The method of claim 6, further comprising:
   generating a mucus-aqueous index map and/or generating a mucus-aqueous scattering map.

8. The method of claim 7, wherein the index map is based on a ratio of amplitudes of corresponding peaks in the frequency analysis of the reflectance information and the frequency analysis of the theoretical model of the object.

9. The method of claim 7, wherein the index map is based on a difference of amplitudes of corresponding peaks in the frequency analysis of the reflectance information and the frequency analysis of the theoretical model of the object.

10. The method of claim 7, wherein the scattering map is based on a ratio of a full width at half maximum or a half width at half maximum of corresponding peaks in the frequency analysis of the reflectance information and the frequency analysis of the theoretical model of the object.

11. The method of claim 7, wherein the scattering map is based on a difference of a full width at half maximum or a half width at half maximum of corresponding peaks in the frequency analysis of the reflectance information and the frequency analysis of the theoretical model of the object.

12. The method of claim 7, further comprising:
   determining a scaling factor based on the generated mucus-aqueous index map and/or the mucus-aqueous scattering map; and
   adjusting the obtained fringe image based on the scaling factor.

13. The method of claim 1, wherein the method is performed in real-time with imaging of the object.

14. The method of claim 1, wherein the fringe images are obtained by imaging the object with an interferometric imaging system utilizing discrete narrow spectral bands.

* * * * *